United States Patent
Liu et al.

(10) Patent No.: US 12,141,359 B1
(45) Date of Patent: Nov. 12, 2024

(54) VIBRATION FEEDBACK DEVICE AND CONTROL METHOD THEREOF

(71) Applicant: TOPRAY MEMS INC., Hsinchu (TW)

(72) Inventors: Chin-Sung Liu, Hsinchu (TW); Tzu-Kuang Fang, Hsinchu (TW); Hsiao-Ming Chien, Hsinchu (TW); Shin-Ter Tsai, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 0 days.

(21) Appl. No.: 18/244,959

(22) Filed: Sep. 12, 2023

(30) Foreign Application Priority Data

Aug. 2, 2023 (TW) .................................. 112129070

(51) Int. Cl.
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
CPC .................................. G06F 3/016; G06F 3/044
See application file for complete search history.

(56) References Cited

U.S. PATENT DOCUMENTS

| | | | | |
|---|---|---|---|---|
| 10,866,642 | B2* | 12/2020 | Rosenberg | G06F 3/047 |
| 11,989,362 | B1* | 5/2024 | Glad | G06F 3/0414 |
| 2012/0169148 | A1* | 7/2012 | Kim | H02K 33/16 310/25 |
| 2017/0090574 | A1* | 3/2017 | Baer | G06F 3/016 |
| 2019/0339776 | A1* | 11/2019 | Rosenberg | G06F 3/0416 |
| 2020/0059149 | A1* | 2/2020 | Liu | H02K 33/16 |
| 2022/0011868 | A1* | 1/2022 | Junus | G06F 3/045 |
| 2023/0333656 | A1* | 10/2023 | Liu | G01L 1/122 |
| 2024/0053857 | A1* | 2/2024 | Kuo | G06F 3/04164 |

FOREIGN PATENT DOCUMENTS

CN 111245190 A * 6/2020 ............. H02K 33/02

* cited by examiner

*Primary Examiner* — Kenneth Bukowski
(74) *Attorney, Agent, or Firm* — Lin & Associates Intellectual Property, Inc.

(57) ABSTRACT

A vibration feedback device and control method thereof are provided. The vibration feedback device includes a substrate, a frame and a plurality of displacement restoration devices; one end of each displacement restoration device is connected to the frame, and the other end is connected to the substrate; one side of the substrate is the user operation surface, and the other side includes at least one driving coil, at least one induction coil, a controller and a driver; the frame also includes a first magnet set corresponding to the driving coil and a second magnet set corresponding to the induction coil; the controller processes the signal obtained by the induction coil to drive the vibration feedback device to achieve a reliable vibration suppression effect.

10 Claims, 14 Drawing Sheets

VIBRATION FEEDBACK DEVICE AND CONTROL METHOD THEREOF

BACKGROUND OF THE INVENTION

1. Field of the Invention

The present invention relates generally to a field of vibration control, and more particularly, to provide a vibration feedback device and control method thereof.

2. The Prior Arts

The vibration feedback function of electronic products such as tablet computers, touch panels, etc. is gradually becoming popular. For example, a common vibration feedback generation method is that a controller provides a preset driving waveform, and a driver drives the vibration generating components. The drive waveform usually includes an activation phase, i.e., generating vibrations for vibration feedback, and a deceleration phase, i.e., causing the vibrations to stop for a clear-cut touch sensation.

Many factors, including the material of the product, accuracy in limited size, consistency of properties, and stability to the operating environment and time, and even the characteristics variation of the product; or due to operator conditions, such as the force exerted by the hand on the touch panel or the size of the contact area, coupling to the product, may also change the behavior of the product. If the characteristics of the product are changed, but still with a fixed preset drive, the aforementioned vibration sensation may deviate from the expected target.

SUMMARY OF THE INVENTION

A primary objective of the present invention is to provide a vibration feedback device and control method thereof, by forming a closed-loop driver architecture, reducing the trouble of deviating from the expected target under vibration conditions.

To achieve the aforementioned objective, the invention provides a vibration feedback device, including a substrate, having a first surface and a second surface, the first surface being a user operation surface, the second surface comprising at least one driving coil, at least one induction coil, a controller and a driver, the controller is electrically connected to the user operation surface, the at least one induction coil, the driver and the at least one driving coil, the at least one induction coil, a controller, and a driver; the driver being electrically connected to the user operation surface, the at least one driving coil, and the at least one induction coil, and the driver, the at last one driving coil and the at least one induction coil being disposed apart from each other; a frame, disposed opposite to the second surface of the substrate, and comprising a first magnet set corresponding to the at least one driving coil and a second magnet set corresponding to the at least one induction coil disposed corresponding to the second surface of the substrate; and at least three displacement restoration devices, one end of each displacement restoration device being connected to the frame, and the other end of each displacement restoration device connected to the substrate.

In some embodiments, the substrate is a touch panel, a flat keyboard or a touch screen of a tablet computer.

In some embodiments, the frame is fixed to an external device with a greater volume and weight.

In some embodiments, the at least one driving coil is wound and arranged at an appropriate position corresponding to the first magnet set on the frame, and a driving force on the driving coil relative to the corresponding first magnet set is generated by applying a current to the at least one driving coil; a winding axis, defined as Z-axis, of the driving coil is perpendicular to the second surface of the substrate, and an actor interacting with the at least one driving coil is a component of a magnetic field (B-field) perpendicular to the second surface of the substrate, and the driving force is parallel to an extension direction, defined as Y-axis, of the second surface of the substrate.

In some embodiments, the at least one induction coil is wound and arranged at an appropriate position corresponding to the second magnet set on the frame to obtain an induced voltage proportional to a motion speed of the substrate relative to the frame, a winding axis, defined as Z-axis, of the induction coil is perpendicular to the second surface of the substrate, and an actor interacting with the at least one induction coil is a component of a magnetic field (B-field) perpendicular to the second surface of the substrate, and the induced voltage reflects a component of the motion speed relative to the second surface in an extension direction, defined as Y-axis.

In some embodiments, each of the displacement restoration devices is a cantilever beam, an extension direction, defined as X-axis, of the cantilever beam is parallel to the extension direction of the second surface of the substrate and is perpendicular to a direction, defined as Y-axis, of the driving force.

In some embodiments, the user operation surface uses a capacitive detection sensor, a pressure sensor, a Hall sensor, or an impedance sensor, which is configured as a trigger signal unit to provide a trigger signal to be received by the controller.

The present invention also provides a vibration feedback control method, applicable to the aforementioned vibration feedback device having a controller, the control method comprising: entering a state of receiving a trigger signal, the controller receiving a trigger signal from a trigger signal unit; after the controller receiving the trigger signal, entering a closed-loop control state; confirming whether the controller outputting a preset excitation signal, if so, proceed to the next step, if not, return to the previous step; the controller executing and completing the outputting of the preset excitation signal; the controller reading an induced voltage for feedback control; multiplying the induced voltage with an appropriate ratio; the controller outputting a driving signal to control a driving coil; confirming whether the controller completing the output of the driving signal within a control time, if so, then end; if not, return to the step of the controller reading the induced voltage for feedback control.

In some embodiments, the controller also receives the induced voltage of the connected induction coil, and converts the induced voltage into a feedback signal to become the driving signal, and the feedback signal can be used as a function to suppress the motion or vibration of the substrate relative to the frame, the controller can switch the excitation signal, the output and the termination of the feedback signal.

In order to make the aforementioned objectives, features and advantages of the present invention more obvious and understandable, the specific embodiments listed in conjunction with each drawing are described in detail below.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

The accompanying drawings are included to provide a further understanding of the invention, and are incorporated in and constitute a part of this specification. The drawings illustrate embodiments of the invention and, together with the description, serve to explain the principles of the invention.

Figure 4A:
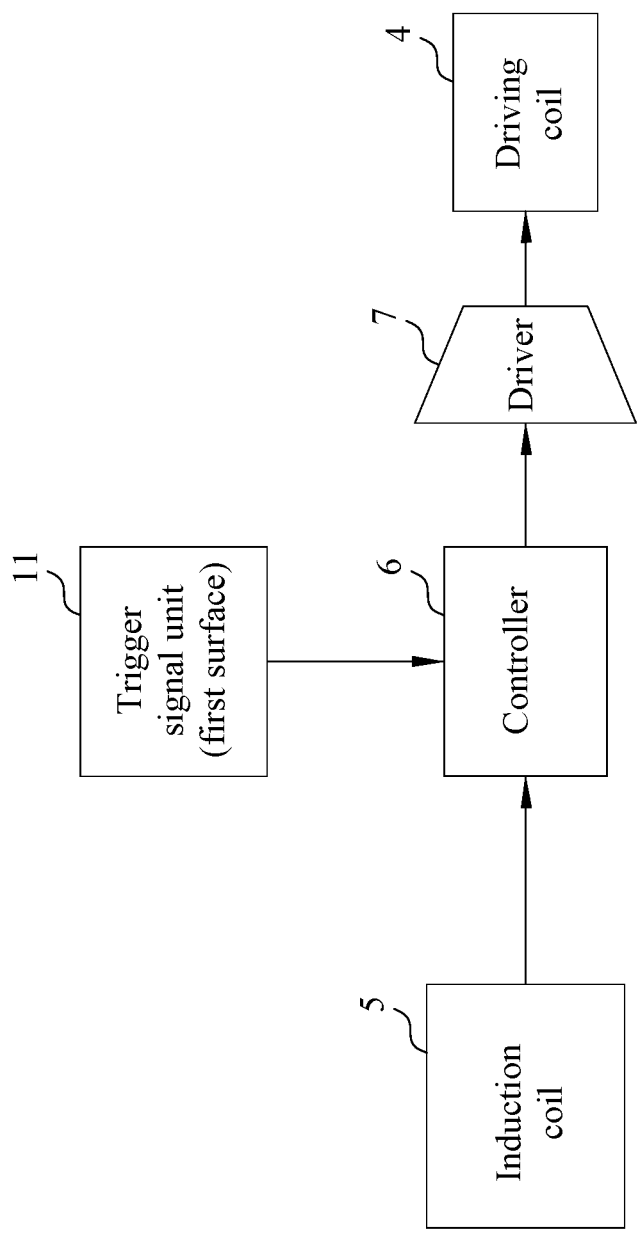
FIG. 4a is a structural block diagram of the vibration feedback device according to the present invention.
Figure 5A:
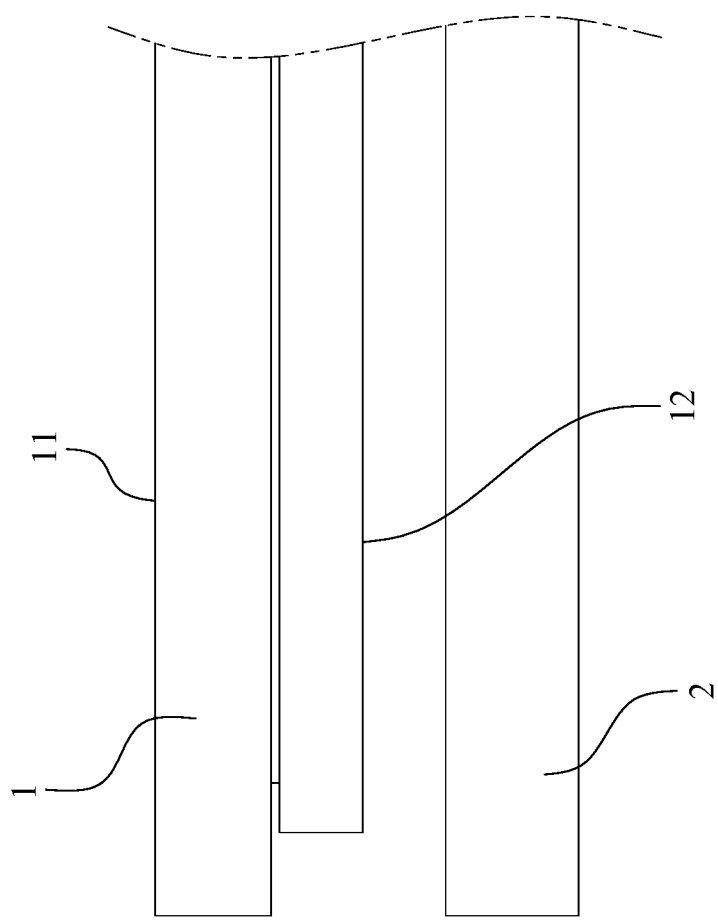
FIG. 5a is a schematic partial side view of the vibration feedback device according to the present invention.
Figure 5B:
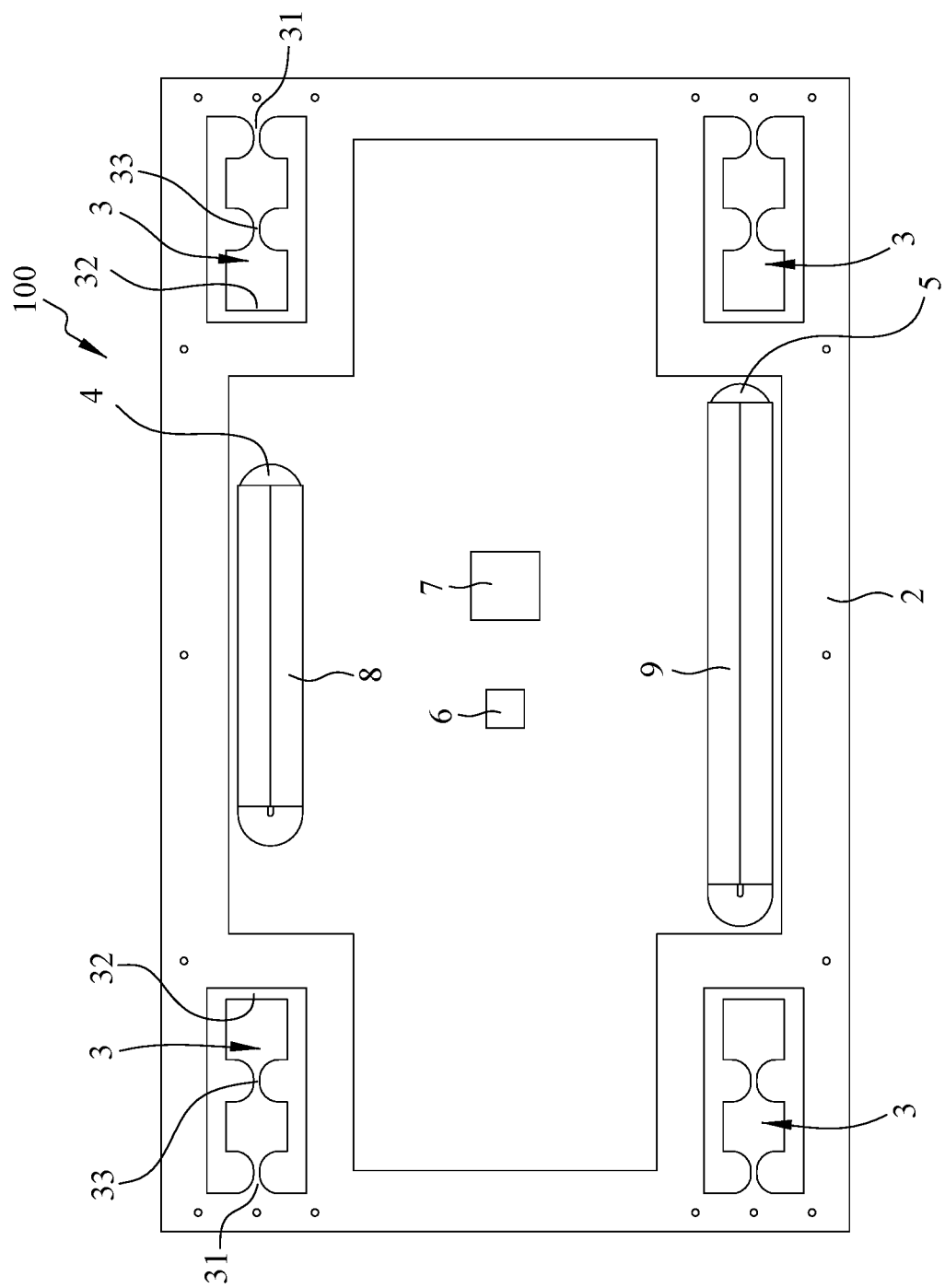
FIG. 5b is a schematic plan view of a surface of the vibration feedback device relative to the user operating surface according to the present invention.
Figure 5C:
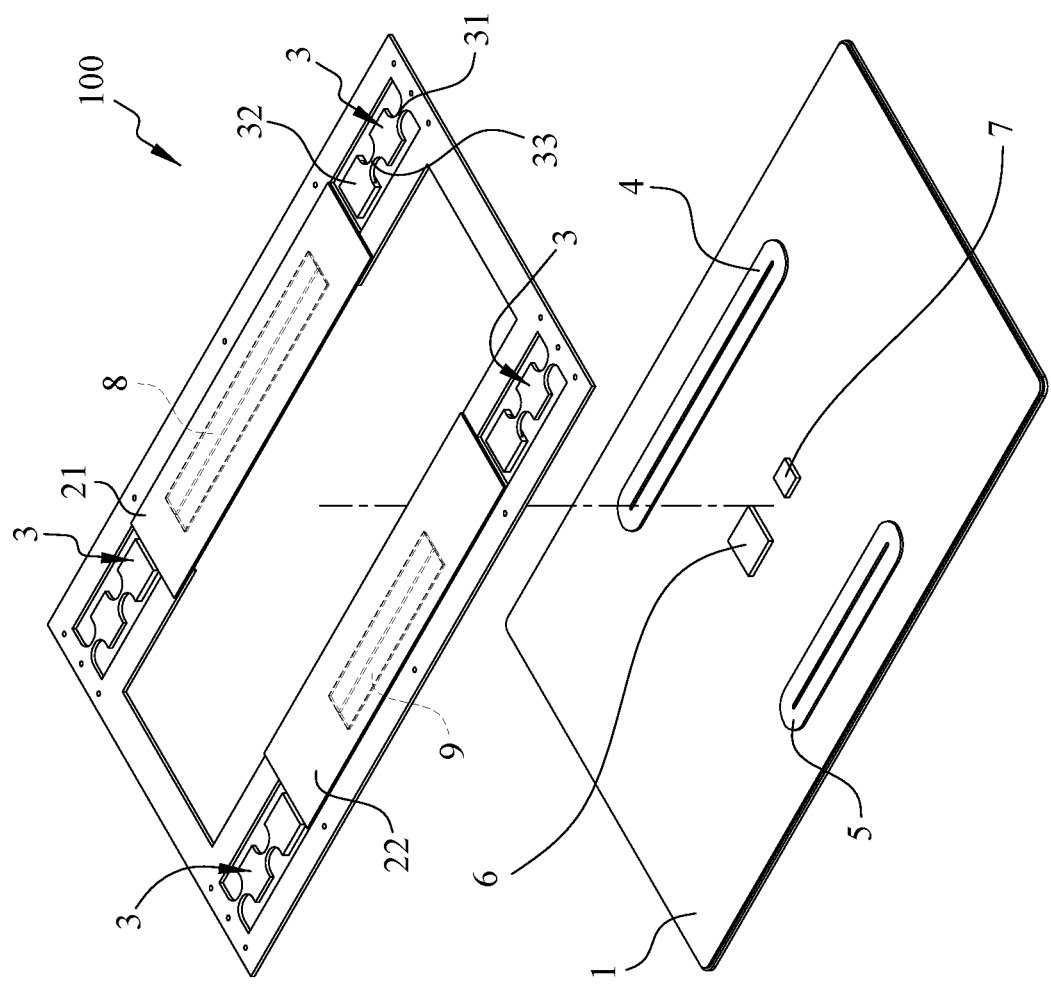
FIG. 5c is a partially exploded schematic view of the vibration feedback device according to the present invention.

FIG. 4a is a structural block view of a vibration feedback device according to the present invention. FIG. 5a is a schematic partial side view of the vibration feedback device according to the present invention. FIG. 5b is a schematic plan view of a surface of the vibration feedback device relative to the user operation surface according to the present invention. FIG. 5c is an exploded schematic view of the vibration feedback device according to the present invention.

Refer to FIG. 4a, FIG. 5a, FIG. 5b, and FIG. 5c, the vibration feedback device 100 of the present invention includes a substrate 1, a frame 2, and at least three displacement restoration devices 3. In the embodiment of the present invention, four displacement restoration devices are used as illustrations, but it is not limited thereto.

The substrate 1 has a first surface 11 and a second surface 12. The first surface 11 is used as a user operation surface. The second surface 12 includes at least one driving coil 4, at least one induction coil 5, a controller 6, and a driver 7. The controller 6 is electrically connected to the user operation surface of the first surface 11, the at least one induction coil, the driver 7, and the at least one driving coil 4. In some embodiments, the user operation surface of the first surface 11 uses a capacitive detection sensor, a pressure sensor, a Hall sensor, or an impedance sensor, which is configured as a trigger signal unit (i.e., the first surface 11), providing a trigger signal to be received by the controller 6.

In some embodiments, the substrate 1 can be one of a touch panel, a flat keyboard, a touch screen of a tablet computer, etc., wherein one side (i.e., the user operation surface of the first surface 11) can receive a position and a pressure applied by a finger on the substrate, and the substrate 1 can detect the position and pressure of the finger. When the substrate 1 needs to respond to an operation, the vibration of the substrate 1 can be used as vibration feedback.

The frame 2 is disposed corresponding to the second surface 12 of the substrate 1. The frame 2 corresponding to the second surface 12 includes a first magnet set 8, which is disposed correspondingly to the at least one driving coil 4 and a second magnet set 9, which is disposed correspondingly to the at least one induction coil 5. In some embodiments, the at least one driving coil 4 and the at least one induction coil 5 are disposed apart from each other.

One end (i.e., first end 31) of each displacement restoration device 3 is connected to the frame 2, and the other end (i.e., second end 32) of each displacement restoration device 3 is connected to the substrate 1.

In some embodiments, the frame 2 is fixed on an external device with a larger volume and weight, so that the frame 2 can be regarded as approximately fixed. The frame 2 is connected to the substrate 1 through the displacement restoration device 3, the substrate 1 can move (including vibration) relative to the frame 2 and return to its natural position through the displacement restoration device 3 when no force is applied.

In some embodiments, the at least one driving coil 4 is wound and arranged at an appropriate position corresponding to the first magnet set 8 on the frame 2, and a driving force on the driving coil 4 relative to the corresponding first magnet set 8 is generated by applying a current to the at least one driving coil 4; a winding axis, defined as Z-axis, of the driving coil is perpendicular to the second surface 12 of the substrate 1, and an actor interacting with the at least one driving coil 4 is a component of a magnetic field (B-field) perpendicular to the second surface 12 of the substrate 1, and the driving force is parallel to an extension direction, defined as Y-axis, of the second surface 12 of the substrate 1.

Similarly, in some embodiments, the at least one induction coil 5 is wound and arranged at an appropriate position corresponding to the second magnet set 9 on the frame 2 to obtain an induced voltage proportional to a motion speed of the substrate 1 relative to the frame 2, a winding axis, defined as Z-axis, of the induction coil 5 is perpendicular to the second surface 12 of the substrate 1, and an actor interacting with the at least one induction coil 5 is a component of a magnetic field (B-field) perpendicular to the second surface 12 of the substrate 1, and the induced voltage reflects a component of the motion speed relative to the second surface 12 in an extension direction, defined as Y-axis.

In some embodiments, each of the displacement restoration devices 3 is a cantilever beam, an extension direction, defined as X-axis, of the cantilever beam is parallel to the extension direction of the second surface 12 of the substrate 1 and is perpendicular to a direction, defined as Y-axis, of the driving force. The second end 32 of each displacement restoration device 3 in the form of a cantilever beam is connected to a surface facing the substrate 1 and connected to the substrate 1, so as to achieve the vibration damping effect of the cantilever beam. In some other embodiments, the cantilever beam includes at least a narrow neck section 33. With different width designs, the displacement restoration device 3, which is a cantilever beam, can obtain better damping and vibration restoration efficiency.

Figure 4B:
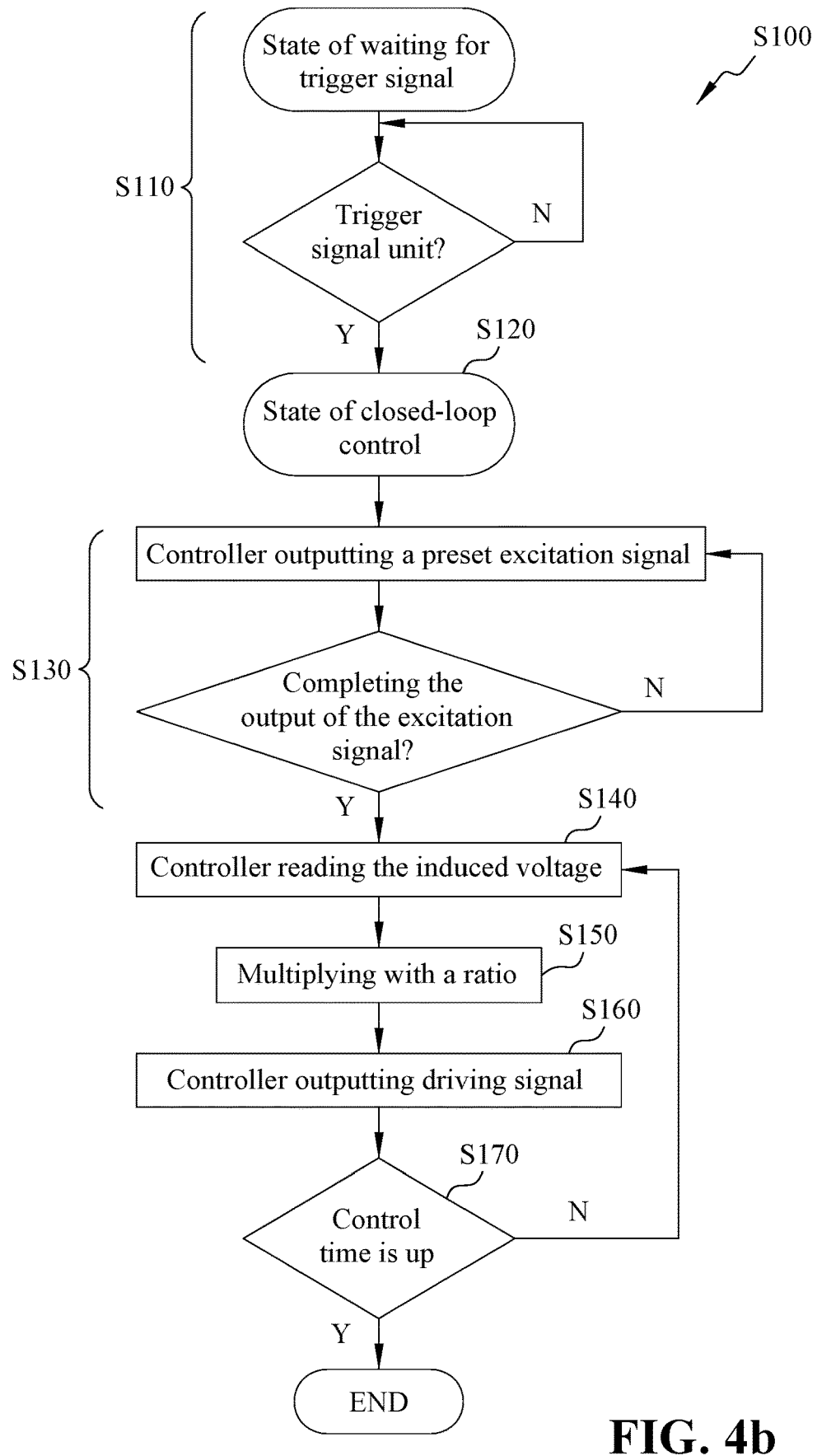
FIG. 4b is a flow chart of a vibration feedback control method according to the present invention.

FIG. 4b is a flowchart of the vibration feedback control method according to the present invention. Refer to FIG. 4b, as well as FIG. 4b, FIG. 5a, FIG. 5b, and FIG. 5c, the vibration feedback control method S100 of the vibration feedback device 100 of the present invention includes the following steps of: entering a state of receiving the trigger signal, the controller receiving a trigger signal from a controller (step S110); after the controller receiving the trigger signal, entering a closed-loop control state (step S120); confirming whether the controller outputting a preset excitation signal; if yes, then proceed to the next step; if not, then return to the previous step (step S130); the controller executing the output of the preset excitation signal; the controller reads an induced voltage for feedback control (step S140); multiplying the induced voltage by an appropriate ratio (step S150); the controller outputting a driving signal to control a driving coil (step S160); confirming whether the controller completing the output of the driving signal within a control time; if yes, then end; if no, return to the step of the controller reading the induced voltage for feedback control (step S170).

In the aforementioned step S110, the controller 6 presets at least one set of excitation signals as the driving signals. In some embodiments, the controller 6 can also receive the induced voltage of the induction coil 5 connected to it, and convert the induced voltage into a feedback signal into a driving signal, and the feedback signal can be used to suppress the motion or the vibration of the substrate 1 relative to the frame 2. That is, the controller 6 can switch the output of the excitation signal, the feedback signal and the termination of output.

In the vibration feedback control method S100 of provided for the vibration feedback device 100, the controller 6 can be set as a server to receive the trigger signal from the trigger signal unit; and when the trigger signal is received, the control process will be executed according to FIG. 4b. After completion, the process returns to the state of waiting for trigger signal waiting from the trigger signal unit. And the controller 6 will stay in the state of receiving the trigger signal after the power is turned on.

In the state of receiving the trigger signal in step S110, when the trigger signal becomes true, the controller 6 will execute the preset trigger signal and then enter the state of closed-loop control. In the state of closed-loop control of step S120, the induced voltage for feedback control is read and multiplied by an appropriate ratio, and the driving signal is output to control the driving coil 4 until the control time is completed, and the process returns to the state of receiving the trigger signal.

Figure 1A:
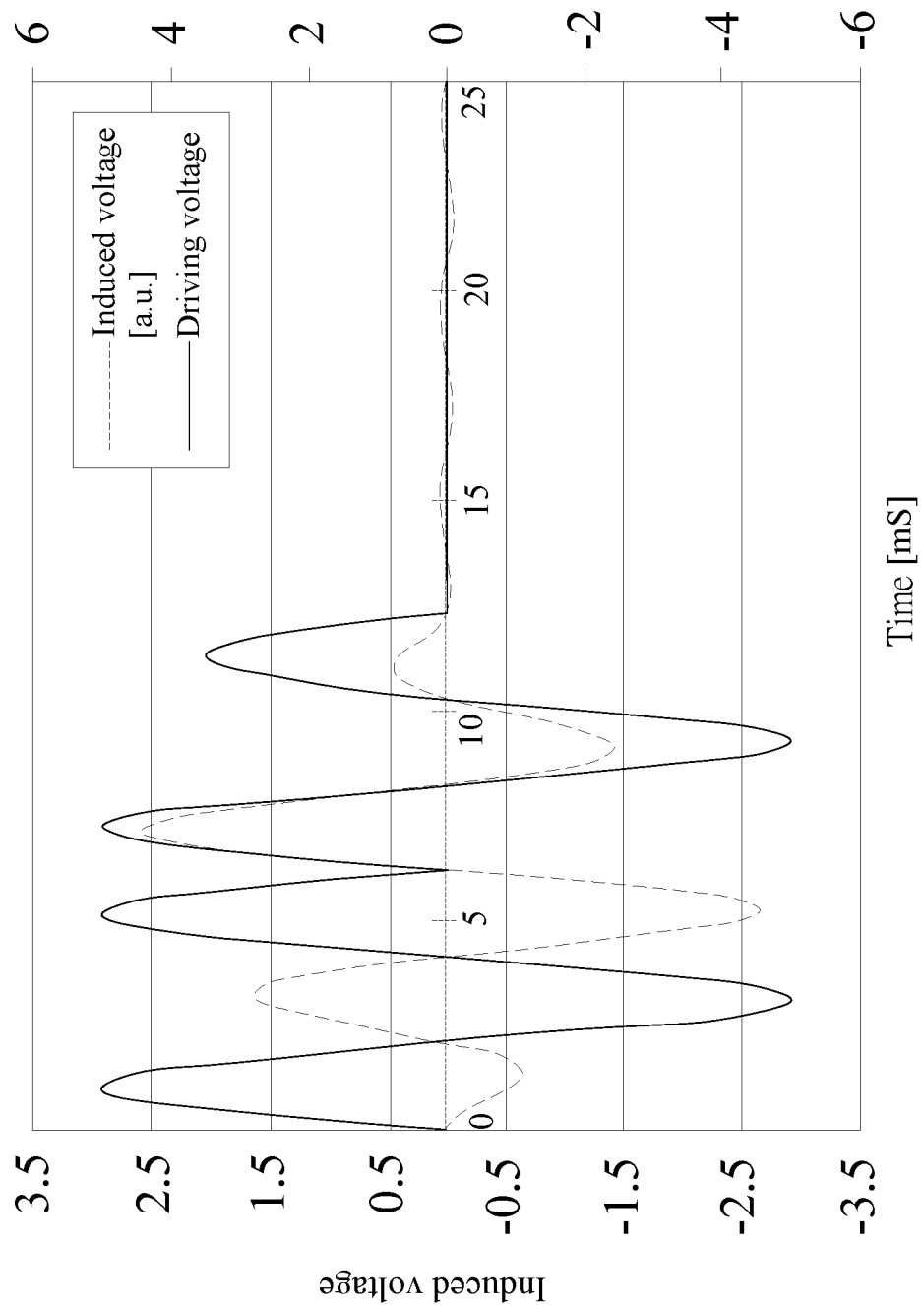
FIGS. 1a-1c are schematic views of voltage versus time waveforms of the first embodiment of the vibration feedback control method according to the present invention.
Figure 1B:
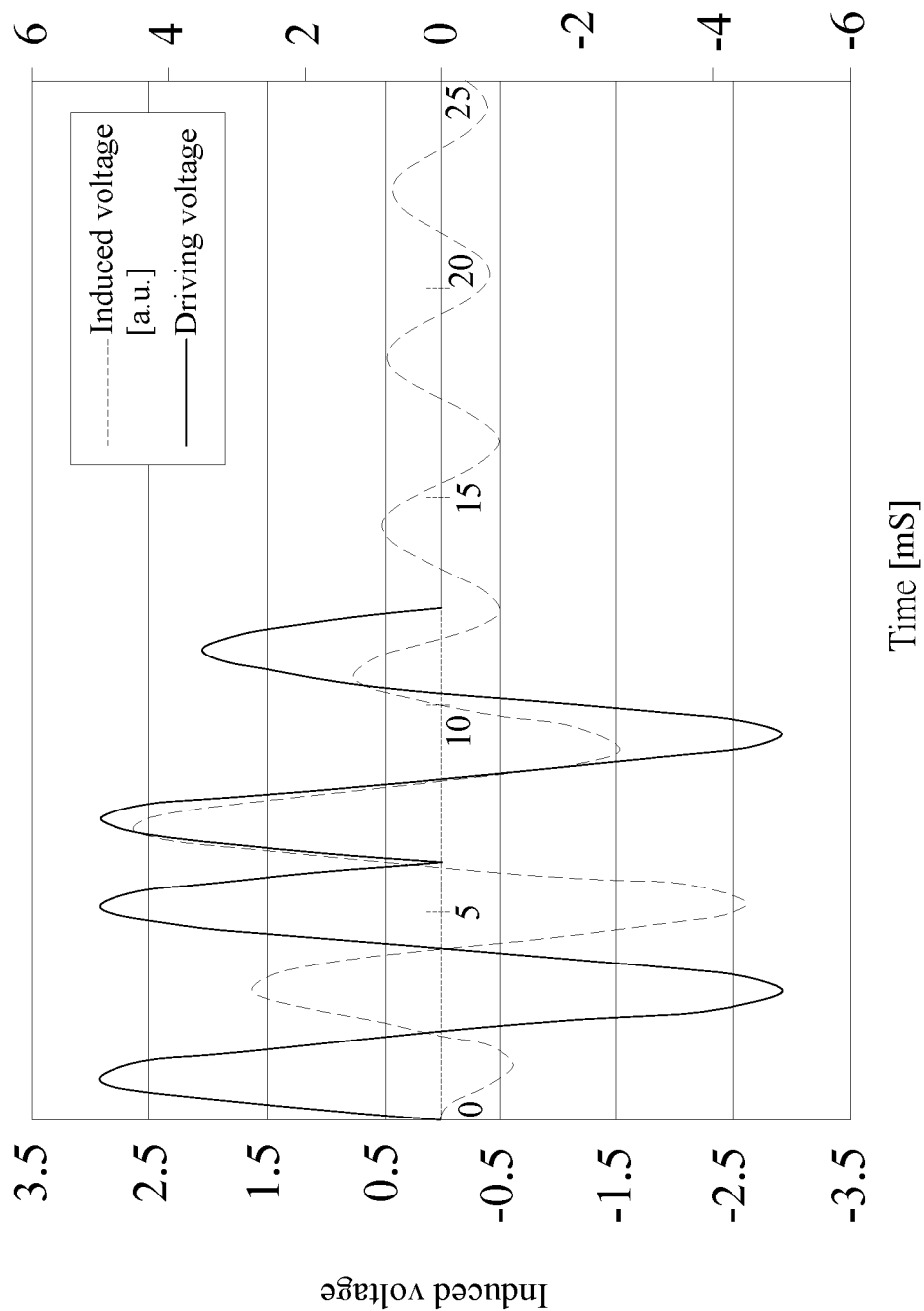
Figure 1C:
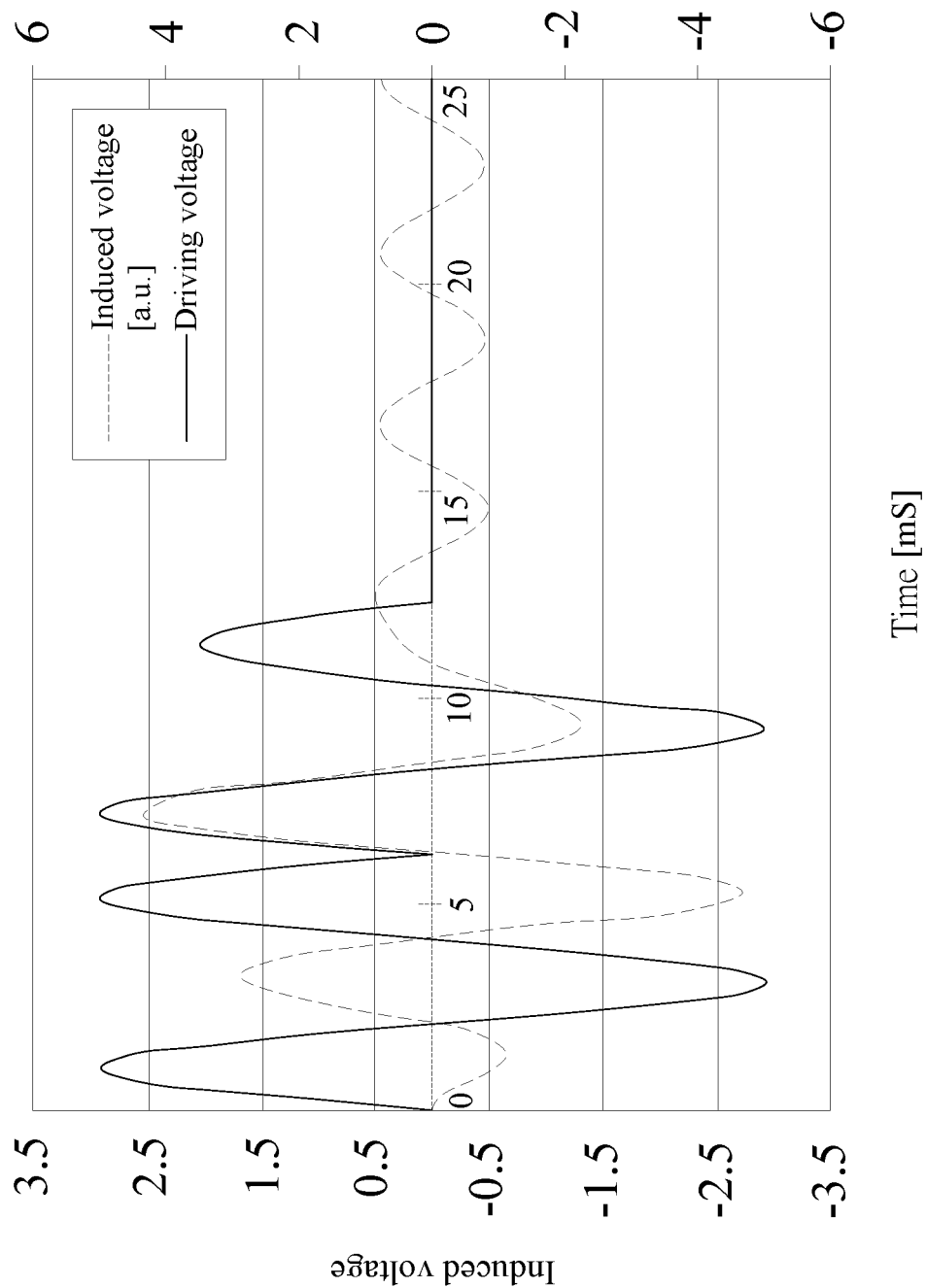

FIGS. 1a to 1c are schematic views of voltage versus time waveforms of the first embodiment of the vibration feedback control method according to the present invention, wherein the vertical axis represents the induced voltage, and the horizontal axis represents time. In FIG. 1 a, when designing an optimal driving signal according to product characteristics, the solid line waveform represents the preset excitation signal, and the dotted line waveform represents the induced voltage of the induction coil 5. In FIG. 1b, when the characteristic frequency of the product increases by 2%, the excitation signal in FIG. 1a is still used. At this point, it can be seen that after the drive stops, there is still an obvious induced voltage, that is, there is residual vibration of the substrate 1 relative to the frame 2. In FIG. 1c, when the characteristic frequency of the product drops by 2%, the excitation signal in FIG. 1a is still used. It can be seen that after the drive stops, there is still an obvious induced voltage, that is, there is residual vibration of the substrate 1 relative to the frame 2. Refer to FIGS. 1a-1c, the first embodiment of the invention is that the excitation signal according to the characteristics of the specific product can be designed when only using the preset excitation signal to drive, so that the vibration can be suppressed immediately after the vibration is generated. However, when the characteristic frequency of the product deviations by 2%, the same excitation signal cannot effectively suppress the vibration and leave residual vibration. In this example, if there is a 1.4% error in the material size, the characteristic frequency is deviationed by 2%, for example, a deviation of 0.01 mm when the material size is 0.8 mm.

Figure 2A:
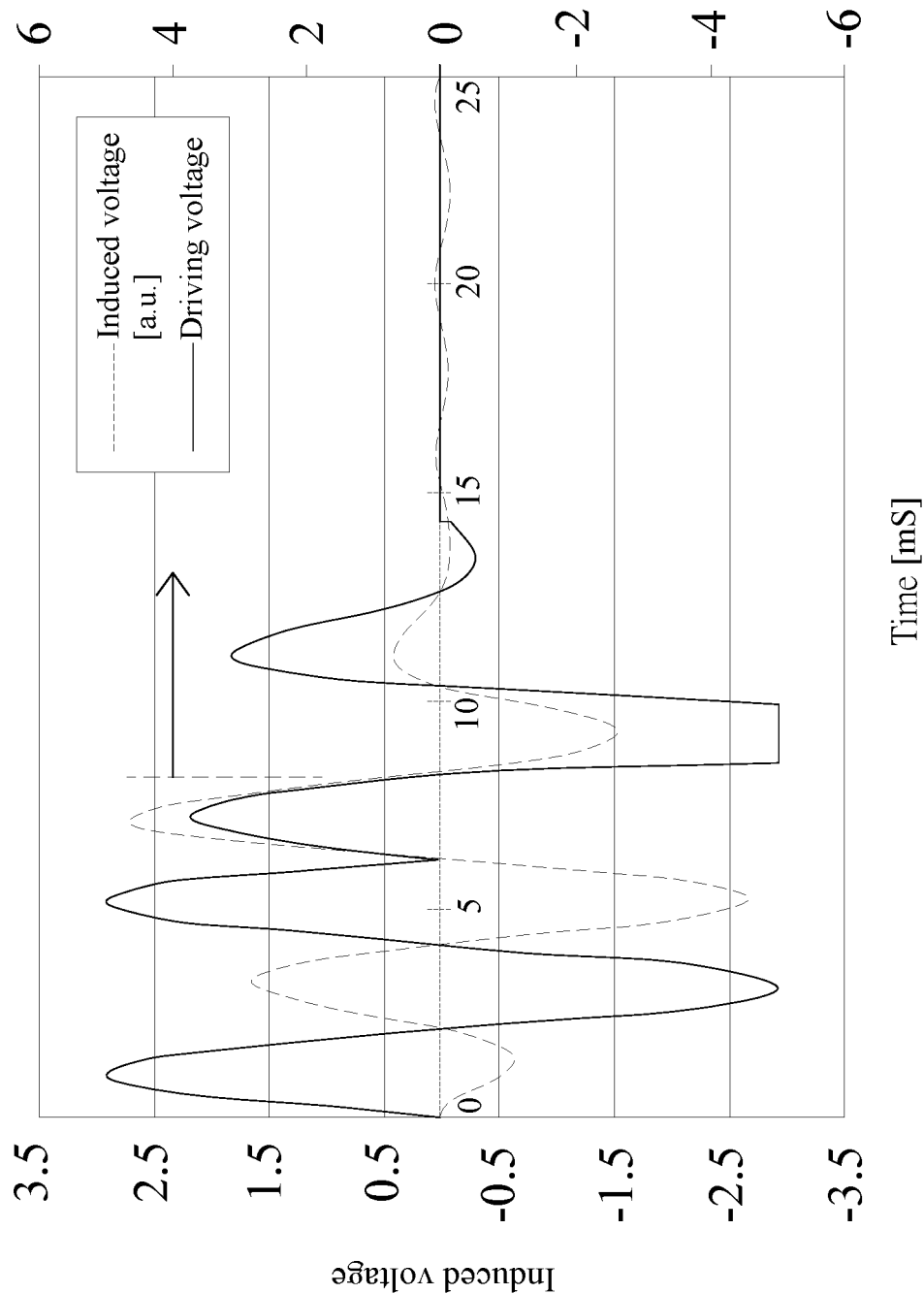
FIGS. 2a-2c are schematic views of voltage versus time waveforms of the second embodiment of the vibration feedback control method according to the present invention.
Figure 2B:
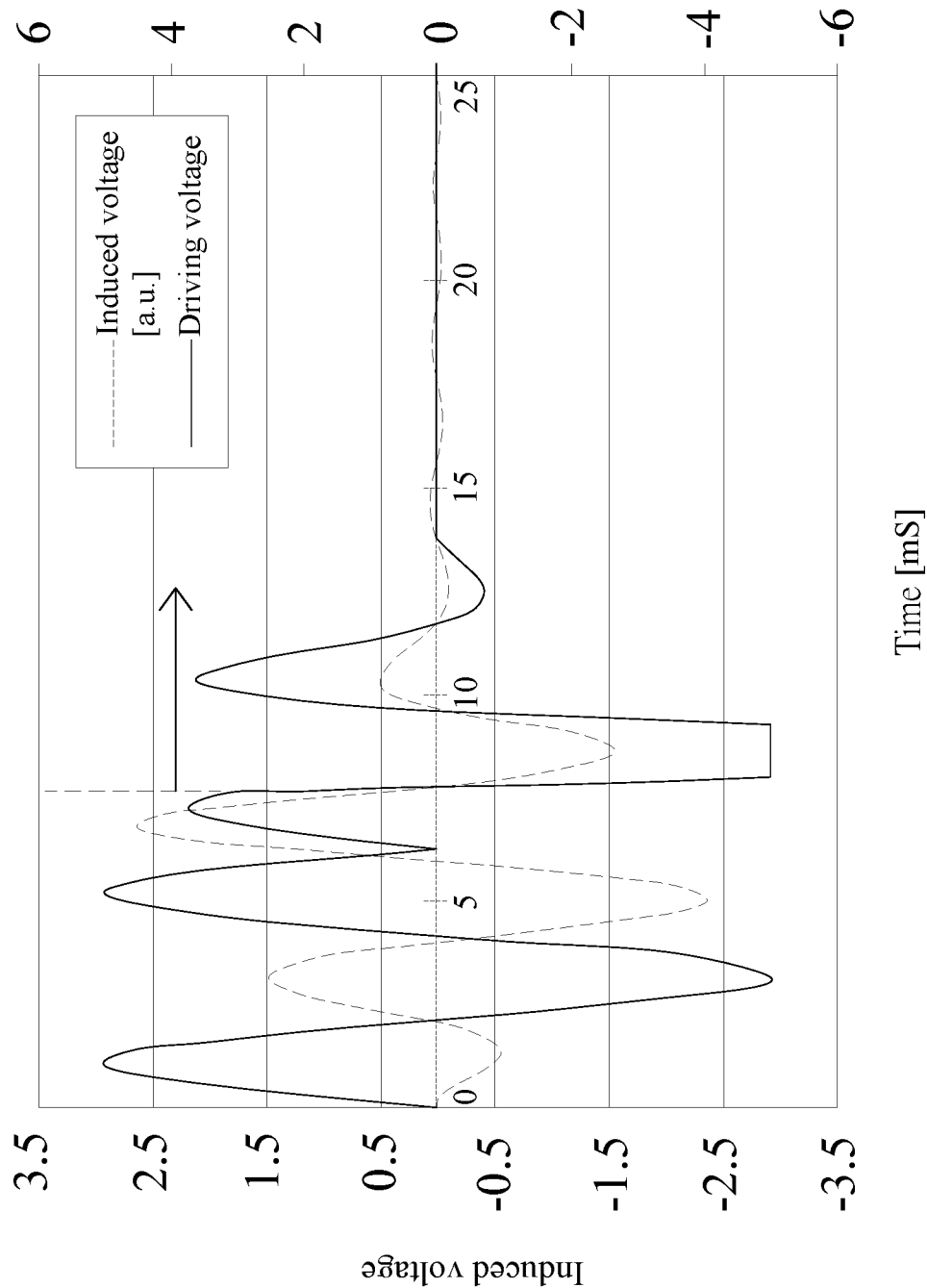
Figure 2C:
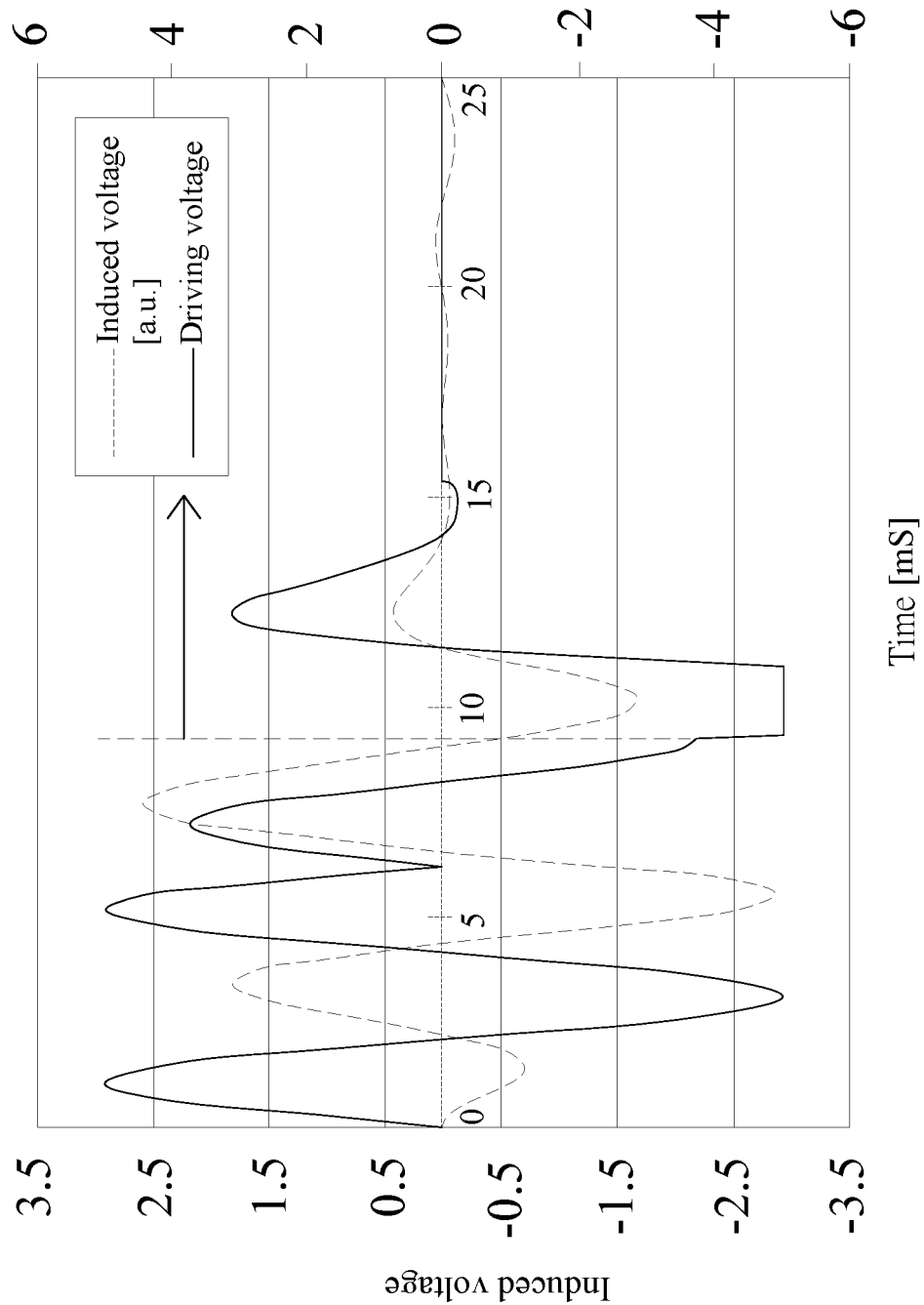

FIGS. 2a to 2c are schematic views of voltage versus time waveforms of the second embodiment of the vibration feedback control method according to the present invention, wherein the vertical axis represents the induced voltage, and the horizontal axis represents time. In FIG. 2a, a better excitation signal drive is designed according to the characteristics of the product to be used with a closed-loop drive. The solid line waveform represents the preset excitation signal, the dotted line waveform represents the induced voltage of the induction coil 5, and the arrow represents the closed-loop drive. In FIG. 2b, when the characteristic frequency of the product increases by 10%, the setting in FIG. 2a is still used. It can be seen that after the drive stops, the residual vibration of the substrate 1 relative to the frame 2 is still suppressed. In FIG. 2c, when the characteristic frequency of the product drops by 10%, the setting in FIG. 2a is still used. It can be seen that after the drive stops, the residual vibration of the substrate 1 relative to the frame 2 is still suppressed. Refer to FIGS. 2a-2c, the second embodiment of the present invention is driven by the feedback signal at an appropriate time after using the preset excitation signal to drive. As seen, the vibration is effectively suppressed under different product characteristics frequency deviation, such as ±2%, or even up to ±10% characteristic frequency deviation. The practice in the present embodiment is to multiply the induced voltage by an appropriate ratio as a feedback signal for driving. At this point, the driving force effect is a damping force that is proportional to the relative movement speed but opposite to the relative movement direction.

Figure 3A:
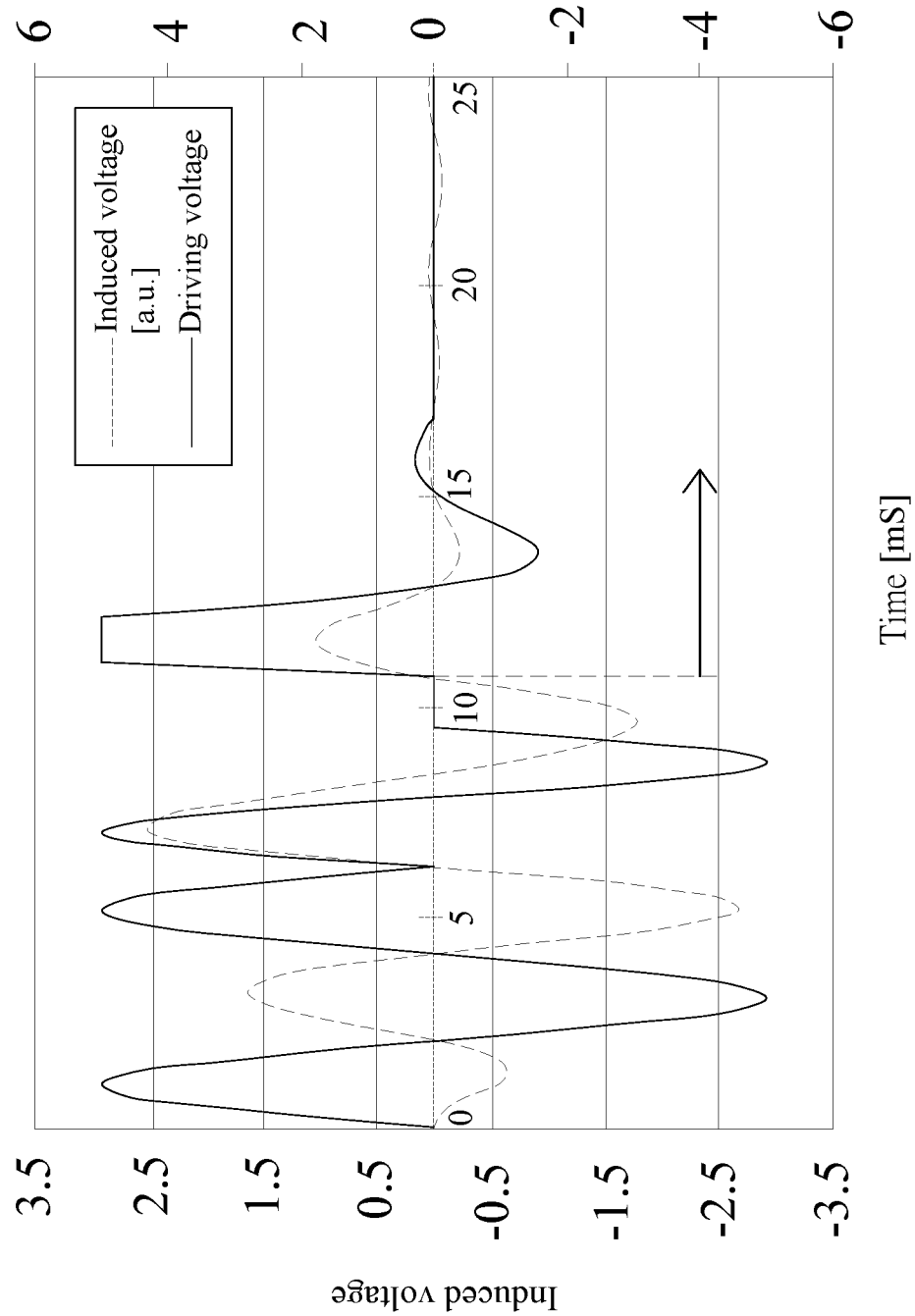
FIGS. 3a-3c are schematic views of voltage versus time waveforms of the third embodiment of the vibration feedback control method according to the present invention.
Figure 3B:
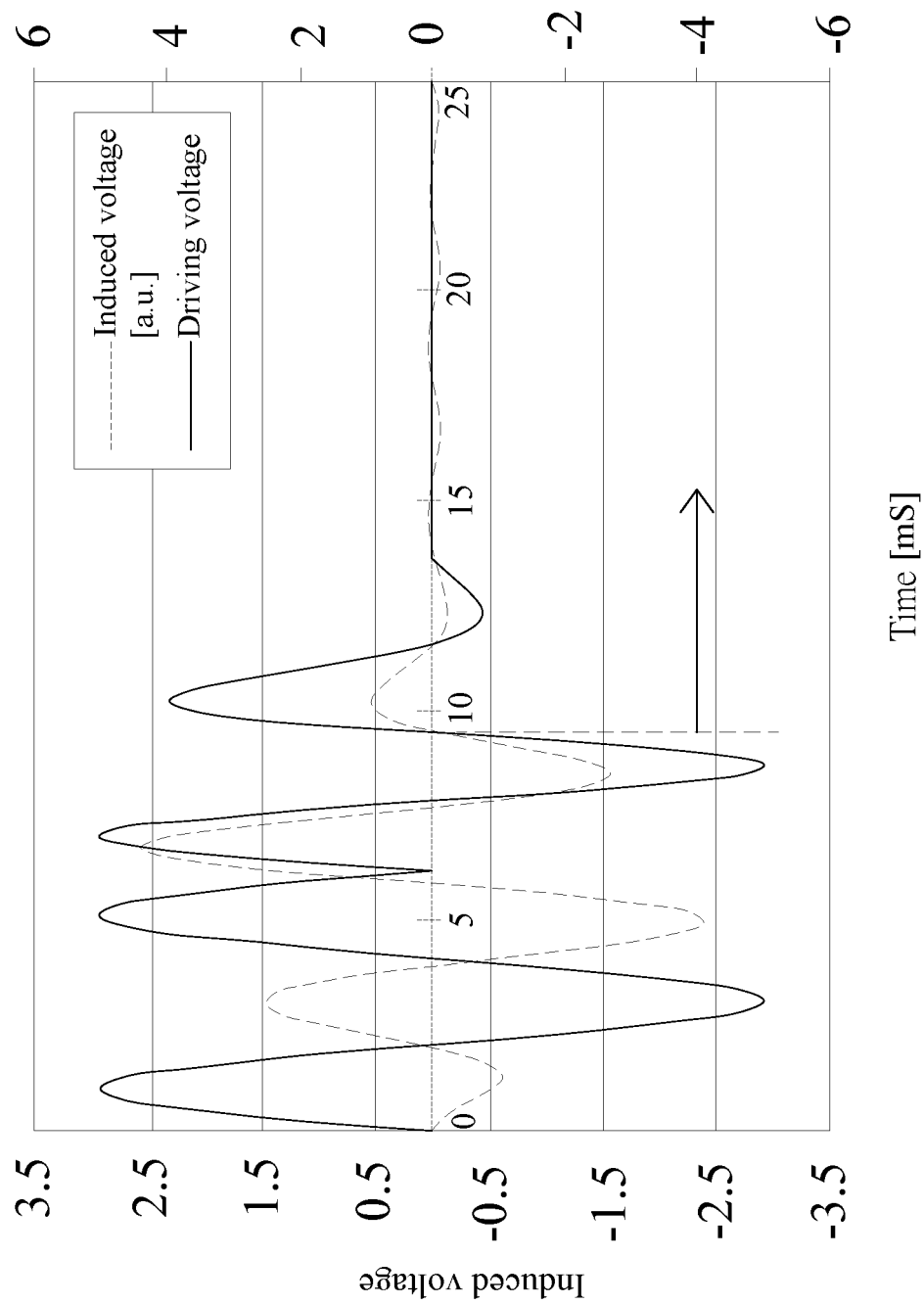
Figure 3C:
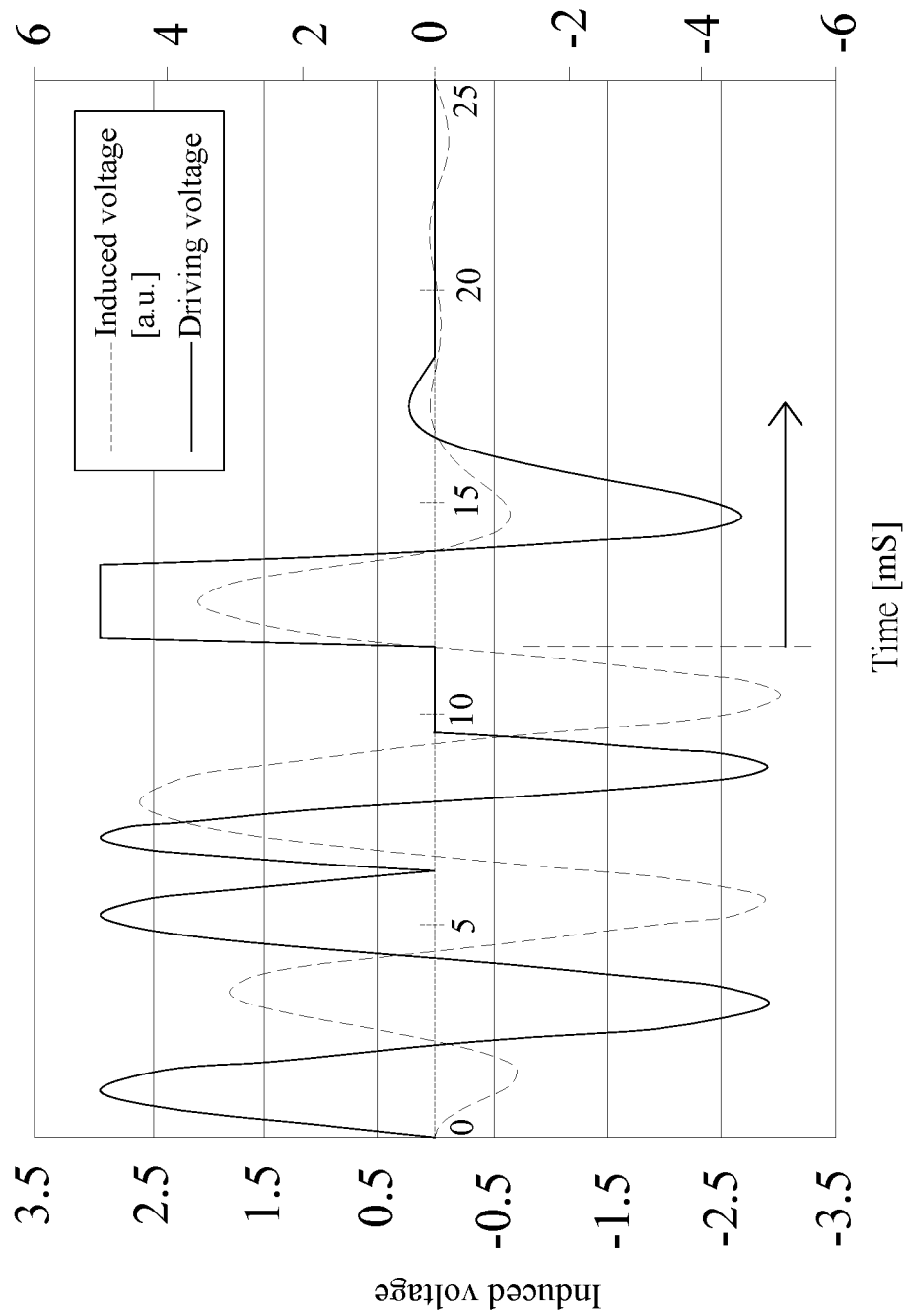

FIGS. 3a to 3c are schematic views of voltage versus time waveforms of the third embodiment of the vibration feedback control method according to the present invention, wherein the vertical axis represents the induced voltage, and the horizontal axis represents time. In FIG. 3a, a better excitation signal driver is designed according to the characteristics of the product, and used with a closed-loop drive. The solid line waveform represents the preset excitation signal, the dotted line waveform represents the induced voltage of the induction coil 5, and the arrow represents the closed-loop drive. In FIG. 3b, when the characteristic frequency of the product increases by 10%, the setting in FIG. 3a is still used. It can be seen that after the drive stops, the residual vibration of the substrate 1 relative to the frame 2 is still suppressed. In FIG. 3c, when the characteristic frequency of the product drops by 10%, the setting in FIG. 3a is still used. It can be seen that after the drive stops, the residual vibration of the substrate 1 relative to the frame 2 is still suppressed.

In summary, the vibration feedback device 100 and control method thereof disclosed in the present invention, wherein the vibration feedback device 100 includes a substrate 1, a frame 2, and a plurality of displacement restoration devices 3; one end of the displacement restoration device is connected to the frame 2, and the other end is connected to the substrate 1; one side of the substrate 1 is the user operation surface, and the other side includes at least one driving coil 4, at least one induction coil 5, a controller 6, and driver 7; the frame 2 also includes a first magnet set 8 corresponding to the driving coil 4, and a second magnet set 9 corresponding to the induction coil 5; the controller 6 processes the signal obtained from the induction coil 5 to drive and provide the vibration feedback device 100 to achieve a reliable vibration suppression effect.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A vibration feedback device, comprising:
   a substrate, having a first surface and a second surface, the first surface being a user operation surface, the second surface comprising at least one driving coil, at least one induction coil, a controller and a driver, the controller is electrically connected to the user operation surface, the at least one induction coil, the driver and the at least one driving coil, the at least one induction coil, a controller, and a driver; the driver being electrically connected to the user operation surface, the at least one driving coil, and the at least one induction coil, and the driver, the at last one driving coil and the at least one induction coil being disposed apart from each other;
   a frame, disposed opposite to the second surface of the substrate, and comprising a first magnet set corresponding to the at least one driving coil and a second magnet set corresponding to the at least one induction coil disposed corresponding to the second surface of the substrate; and
   at least three displacement restoration devices, one end of each displacement restoration device being connected to the frame, and the other end of each displacement restoration device connected to the substrate.

2. The vibration feedback device according to claim 1, wherein the substrate is a touch panel, a flat keyboard or a touch screen of a tablet computer.

3. The vibration feedback device according to claim 1, wherein the frame is fixed to an external device with a greater volume and weight.

4. The vibration feedback device according to claim 1, wherein the at least one driving coil is wound and arranged at an appropriate position corresponding to the first magnet set on the frame, and a driving force on the driving coil relative to the corresponding first magnet set is generated by applying a current to the at least one driving coil; a winding axis, defined as Z-axis, of the driving coil is perpendicular to the second surface of the substrate, and an actor interacting with the at least one driving coil is a component of a magnetic field (B-field) perpendicular to the second surface of the substrate, and the driving force is parallel to an extension direction, defined as Y-axis, of the second surface of the substrate.

5. The vibration feedback device according to claim 4, wherein the at least one induction coil is wound and arranged at an appropriate position corresponding to the second magnet set on the frame to obtain an induced voltage proportional to a motion speed of the substrate relative to the frame, a winding axis, defined as Z-axis, of the induction coil is perpendicular to the second surface of the substrate, and an actor interacting with the at least one induction coil is a component of a magnetic field (B-field) perpendicular to the second surface of the substrate, and the induced voltage reflects a component of the motion speed relative to the second surface in an extension direction, defined as Y-axis.

6. The vibration feedback device according to claim 5, wherein each of the displacement restoration devices is a cantilever beam, an extension direction, defined as X-axis, of the cantilever beam is parallel to the extension direction of the second surface of the substrate and is perpendicular to a direction, defined as Y-axis, of the driving force.

7. The vibration feedback device according to claim 6, wherein the cantilever beam comprises a narrow neck section.

8. The vibration feedback device according to claim 1, wherein the user operation surface uses a capacitive detection sensor, a pressure sensor, a Hall sensor, or an impedance sensor, which is configured as a trigger signal unit to provide a trigger signal to be received by the controller.

9. A vibration feedback control method, applicable to a vibration feedback device having a controller, the control method comprising:
   entering a state of receiving a trigger signal, the controller receiving a trigger signal from a trigger signal unit;
   after the controller receiving the trigger signal, entering a closed-loop control state;
   confirming whether the controller outputting a preset excitation signal, if so, proceed to the next step, if not, return to the previous step;
   the controller executing and completing the outputting of the preset excitation signal;
   the controller reading an induced voltage for feedback control; multiplying the induced voltage with an appropriate ratio;
   the controller outputting a driving signal to control a driving coil; and
   confirming whether the controller completing the output of the driving signal within a control time, if so, then end; if not, return to the step of the controller reading the induced voltage for feedback control.

10. The vibration feedback control method according to claim 9, wherein the controller also receives the induced voltage of the connected induction coil, and converts the induced voltage into a feedback signal to become the driving signal, and the feedback signal can be used as a function to suppress the motion or vibration of the substrate relative to the frame, the controller can switch the excitation signal, the output and the termination of the feedback signal.

* * * * *